United States Patent
Kvalheim

(10) Patent No.: US 7,273,157 B2
(45) Date of Patent: Sep. 25, 2007

(54) ARTICLE FEEDER

(75) Inventor: Andrew M. Kvalheim, Petaluma, CA (US)

(73) Assignee: Kval, Inc., Petaluma, CA (US)

( * ) Notice: Subject to any disclaimer, the term of this patent is extended or adjusted under 35 U.S.C. 154(b) by 326 days.

(21) Appl. No.: 10/681,484

(22) Filed: Oct. 8, 2003

(65) Prior Publication Data

US 2005/0077310 A1    Apr. 14, 2005

(51) Int. Cl.
B65G 59/00   (2006.01)
B65H 1/00    (2006.01)

(52) U.S. Cl. .......................................... 221/68; 221/188

(58) Field of Classification Search ................... 221/68, 221/77, 76, 131, 200, 271, 188, 289, 294; 198/418.1, 427, 436, 468.6, 345.1; 414/224, 414/414; 209/929, 245, 244, 246
See application file for complete search history.

(56) References Cited

U.S. PATENT DOCUMENTS

| | | | | |
|---|---|---|---|---|
| 2,943,964 A | * | 7/1960 | Goldenberg | 442/38 |
| 3,071,291 A | * | 1/1963 | Charles | 221/68 |
| 3,269,594 A | * | 8/1966 | MacKenzie et al. | 221/68 |
| 3,325,051 A | * | 6/1967 | Davis | 221/93 |
| 3,417,542 A | * | 12/1968 | Merrill et al. | 53/167 |
| 3,889,343 A | * | 6/1975 | Miller et al. | 29/809 |
| 4,832,176 A | * | 5/1989 | Okuma et al. | 198/418.1 |
| 4,843,900 A | * | 7/1989 | Jangaard | 74/110 |
| 5,052,167 A | * | 10/1991 | Scharch | 53/444 |
| 5,331,732 A | * | 7/1994 | Kvalheim | 29/787 |
| 5,425,473 A | * | 6/1995 | Kvalheim | 221/188 |
| 5,579,951 A | * | 12/1996 | Revelle et al. | 221/95 |
| 5,645,865 A | * | 7/1997 | Schad et al. | 425/126.1 |
| 5,720,582 A | * | 2/1998 | Morrison et al. | 405/303 |
| 2002/0122694 A1 | * | 9/2002 | Obermeyer | 404/101 |

* cited by examiner

Primary Examiner—Gene O. Crawford
Assistant Examiner—Rakesh Kumar
(74) Attorney, Agent, or Firm—Corwin R. Horton

(57) ABSTRACT

A screw feeder adapted for rapid changeover of screw types. The feeder has a collator section having a floor with slots to collate random screws into rows and an enclosure about the floor for retaining random screws on the floor. The screws are collated by tilting the floor in the slotted direction to raise and lower the upstream end relative to the downstream end and are fed downstream along the slots into slots in a dispensing section. The collator section enclosure has a gate closure at the upstream end of the floor and the slots on the floor extend completely to the upstream end so that, with the gate open and the collator section oscillated to tilt the slots downward toward the upstream end, the screws in the slots will slide to the upstream end and out of the enclosure.

14 Claims, 7 Drawing Sheets

ARTICLE FEEDER

BACKGROUND OF THE INVENTION

This invention relates to devices for collating and feeding screws, nails and other work articles of the same or similar configuration. Such feeders are utilized for supplying such articles to work stations where the articles may be further collated, transported or packaged or they may be used to carry out various operations such as fastening workpieces together, e.g. fastening hinges to door jambs.

Conventional feeders of screws, nails and other uniform articles include devices such as those described in U.S. Pat. Nos. 2,943,764, 3,071,291 and 4,222,495 which collate articles lying randomly in a receptacle by intercepting the articles with a collating device having one or more channels or slots into which the articles drop and which thus capture the articles in queued fashion. The articles are slidable within the slots so that when the slots are tilted above the horizontal about a pivot point at one end thereof, the queued articles will slide in the downhill direction. In his manner the articles are carried in each slot to the end of the slot at the pivot point. At the pivot point are entrances to a second set of slots which communicate with the respective first slots. The articles moving downward along the first slots will thus be transferred one-by-one in a queue, into the second slots. The second slots are fixed and extend downwardly from their entrances so that the queue of articles will slide down the second slots to an escapement mechanism which will stop the queue and then separate each article from the queue, consecutively depositing each article into a receiver which transports each article individually to an appropriate work station.

A problem with foregoing type of feeder is the tendency of the random articles in the receptacle to cause jams that impede the movement of the queued articles in the first set of slots over to the second slots since the random articles sliding in the box reach the entrances to the second set of slots about the same time as those sliding down in a queue in the first set of slots. An attempt to deal with this problem was made in the nail feeder described in U.S. Pat. No. 3,071,291 by employing a gate midway down the length of the oscillating box to meter a smaller number of nails fed into the forward section of the box for collation. However this increases the complexity of the feeder and the random nails in the forward box section still reach the entrances to the second set of slots a about the same time as do the queued nails. Moreover, this approach further complicates removal of articles from the machine for changeover to feeding another style or type of article.

Screw feeders, such as that described in my U.S. Pat. No. 5,425,473, can operate similarly, but instead of having collating slots communicating with separate queuing slots at a pivot point, the queuing slots are simply continuations of the collating slots, without a pivot, to the escapement. In this design the entire receptacle reciprocates about a pivot transverse to the slots, the pivot being located adjacent the escapement and screw receivers to facilitate transfer of the screws from the slots at the escapement to the receivers.

The described feeders may be used to feed a variety of screws, nails, etc. of different configurations, finishes or sizes and it may be necessary to change from one to another frequently. Each substitution requires laborious and time-consuming clearing from these feeders, by hand, of the screws to be replaced, including those captured in the collating slots. In conventional screw feeders it has been necessary to employ a wire to remove by hand each of the screws in the slots.

SUMMARY OF THE INVENTION

This invention relates to a device for dispensing screws or the like from a collection thereof lying in random and feed individual articles to desired locations. Such devices include a collator section having a floor provided with one or more slots for receiving articles from a collection of screw lying at random on the receptacle floor and moving them in a downstream direction of the slots and a queuing section where articles received from the downstream end of the collator section are queued in slots (aligned/in feeding relationship/extend in the same path/in feeding relationship) with respective slots in the collator section and then picked off one by one in each slot by an escapement and deposited one by one into a receiver for delivery to an appropriate work station.

The collator section is mounted for reciprocation about an axis so that the floor and slots therein may be oscillated between a position where the floor is sloping downward from the downstream end to the upstream end to a position where the floor is sloping upward to the upstream end.

The slots of the collator section extend in the upstream direction of the slots fully to the upstream end of the collator section floor. Thus, when the collator section is oscillated to a position where the floor is sloping downward toward the upstream end, the articles residing in the slots, unless otherwise restrained, will slide to the upstream end of the floor and drop from the device.

An enclosure is desirably provided about the collator section floor for normally retaining the desired collection of random articles from falling out of the collator section floor as it oscillates, preferably including a wall along the upstream end of the floor. The enclosure desirably contains a gate closure at the upstream end of the floor that may be opened in order to allow the articles to drop from the device during changeover when the operator is preparing to feed a different screw or other workpiece with the device.

Other features of the invention apply particularly to feeders having a collator that transfers collated articles to a separate dispensing section which is normally inclined downwardly from point of transfer from the collator section so that the transferred articles can slide down to an escapement for dispensing. In one such feature, selectively removable detents are provided for the collator section slots at a location intermediate the upstream and downstream ends of the floor. When in place in the slots, the detents will stop articles that are queued in the slots downstream of their location from moving to the upstream end of the container when the container oscillates downwardly, as do the uncollated mass of articles in the container. Then when the container oscillates back upwardly to the position the articles queued in advance of the detents have a shorter distance to slide to reach the point of transfer of the articles to the slots of the dispensing section as compared to the mass of uncollated articles sliding from the upstream end of the container. Thus most if not all of the queued articles will have transferred over to the dispensing section slots before the mass of uncollated articles arrives at the transfer point to possibly cause jams or otherwise impede the transfer. The detents desirably take the form of pins or the like that project upward in the container when engaged. These projections in the the path of the articles sliding on the container floor will cause the articles to tumble and this action enhances the proclivity for the articles to fall into the collator slots. The detents may be then removed from the slots during changeover so they do not impede the articles to be replaced from sliding to the upstream end and dropping from the device.

In another such feature of the invention means are provided to pivot the dispensing section from its normally downwardly inclined position for dispensing to an upwardly inclined position so that articles queued in the dispensing section slots for dispensing may slide back to the dispensing section and thereby be removed from the feeder for a changeover to dispense a different style or type of article. A related feature concerns feeders of this type that have a gate for regulating the flow of articles between the slots in the oscillating collator section and the slots of the separate dispensing section fed articles from the collator section slots. In this feature means are additionally provided for lifting the regulating gate when the dispensing section is pivoted to the upwardly inclined position so that articles sliding down the dispensing section slots to transfer back to the collator section are not impeded by the regulating gate.

In another feature of the invention, a screw collecting device is provided at the upstream end of the device to intercept the old articles falling from the device during changeover and concentrate them and deliver them to a collection site, such as to a receptacle for storage or the like. Preferably the collection device comprises a funnel having a mouth located below the upstream end of the device and a tube extending downward therefrom to the collection site.

BRIEF DESCRIPTION OF THE DRAWINGS

FIG. 2A is a is fragmentary cross-sectional view taken along lines 2A-2A of FIG. 2.

DETAILED DESCRIPTION OF THE PREFERRED EMBODIMENT

The following description illustrates the manner in which the principles of the invention are applied but is not to be construed as limiting the scope of the invention.

The article feeders of this invention are intended for feeding screws and other workpieces individually to receivers usually for application of the screws in a fastening operation by automatic screw driving equipment. For this purpose they may be mounted for operation at a stationary site or on a carriage or the like for movement together with screw driving equipment to screw driving locations. In the embodiment described here, the screw feeder is mounted on a carriage for use with associated machinery for applying hinges to doors and door jambs, such as described in my U.S. Pat. No. 6,398,004. The carriage moves on rails to appropriate locations along with automatic screwdrivers, to which it supplies screws for automatically applying hinges at those locations.

Figure 1:
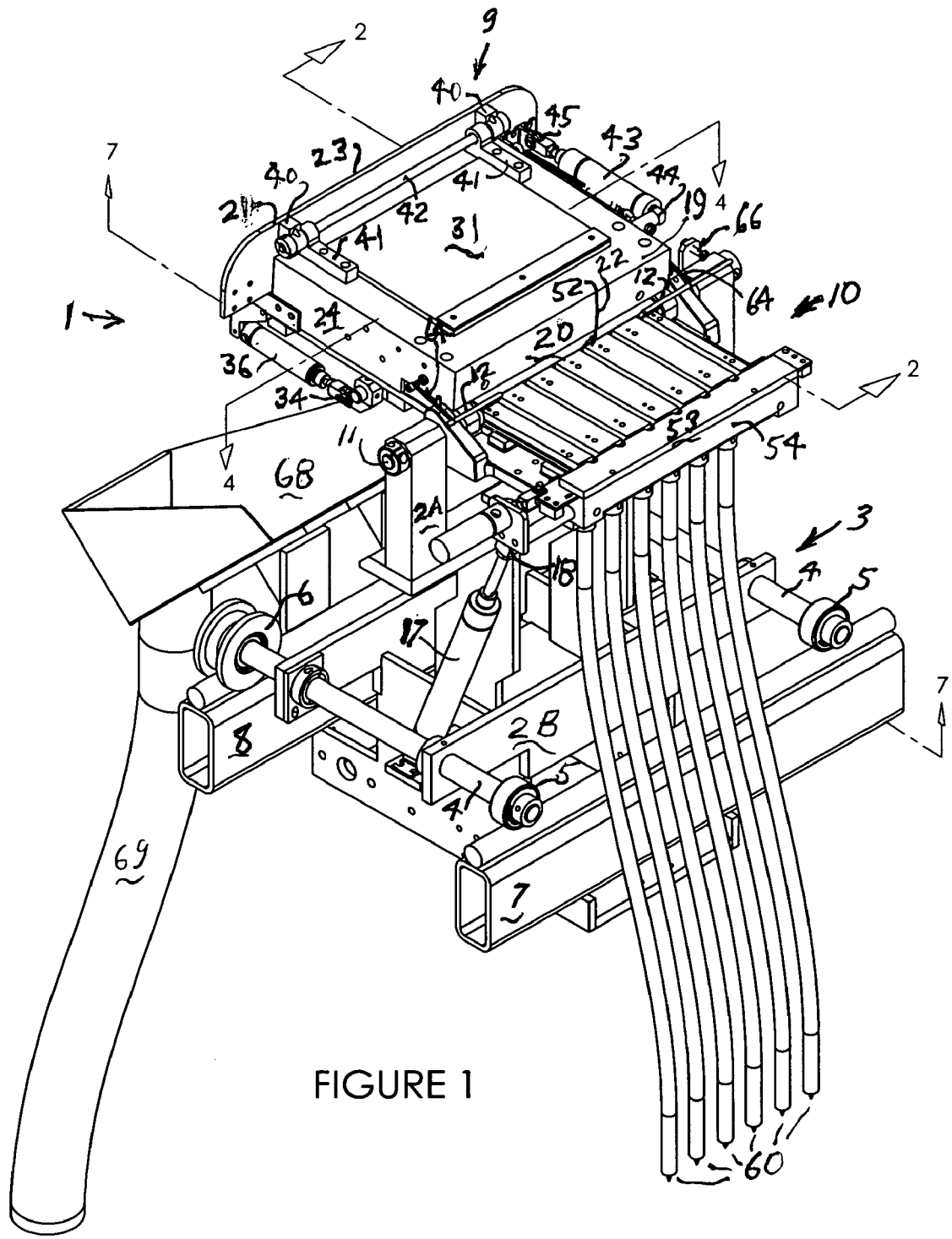
FIG. 1 is an isometric view of an embodiment of the article feeder of the present invention.
Figure 2:
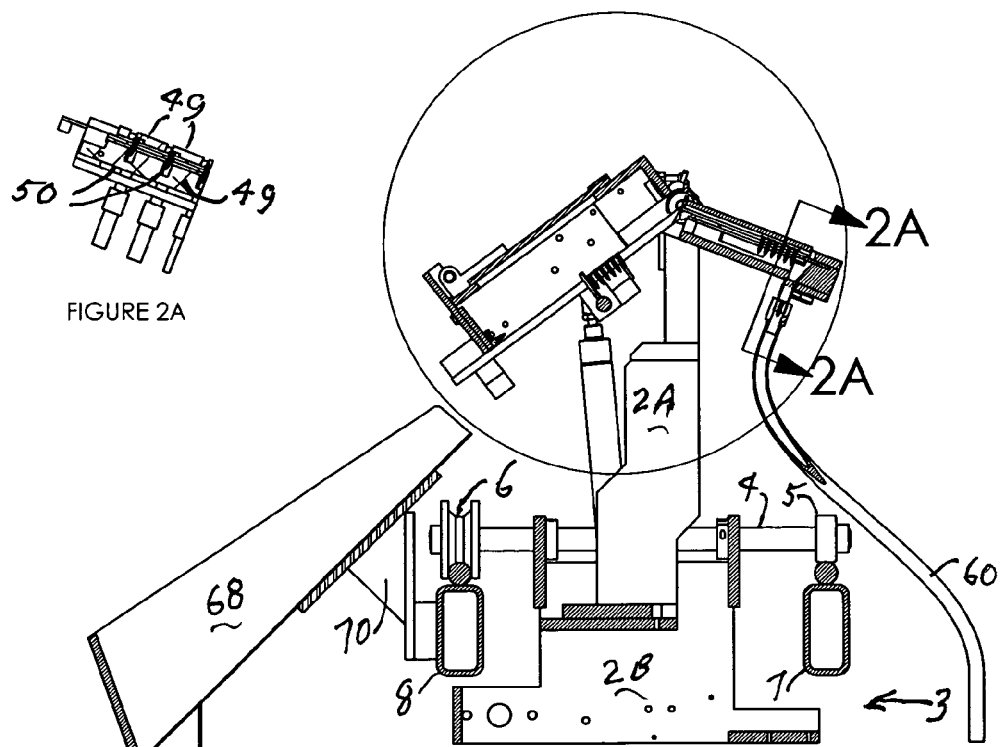
FIG. 2 is a is cross-sectional plan view taken along lines 2-2 of FIG. 1, but showing the collator box tilted downwardly.

Referring to the drawings, particularly to FIGS. 1, 2, 6 and 7, a screw feeder 1 is shown mounted on upstanding brackets 2A which are fixed to stanchions 2B of carriage 3 for movement along with screw driving equipment (not shown), which is also to be attached to stanchion 2B to receive screws from feeder 1. Carriage 3 bears a pair of axles 4, each of which has a guide wheel 5 at one end thereof and a bearing wheel 6 at the other. As best seen in FIGS. 1 and 2, wheels 5 and 6 will roll along guide beam 7 and bearing beam 8 of associated assembly equipment (not shown) to move carriage 3 between locations for screw operations.

Screw feeder 1 has a collator section 9 and a dispensing section 10. Axle 11 is mounted on bracket arms 12 and collator section 9 is mounted on axle 11 by journal bearings 12 for rotation thereabout. Air piston 14 is secured at one end to collator section 9 by pivot 15 and at the other end by a pivot to a base (not shown). Piston 14 is for urging against collator section 9 to pivot it about axle 11 and thus to reciprocate it between two different positions as will be described. Dispensing section 10 is similarly mounted on axle 11 adjacent collator section 9 by journal bearings 16 also for rotation thereabout. Air piston 17 is secured at one end to dispensing section 10 by pivot 18 and at the other end by a pivot to a base (not shown) for urging against dispensing section 10 to pivot it about axle 11 to different positions as will be described.

Figure 3:
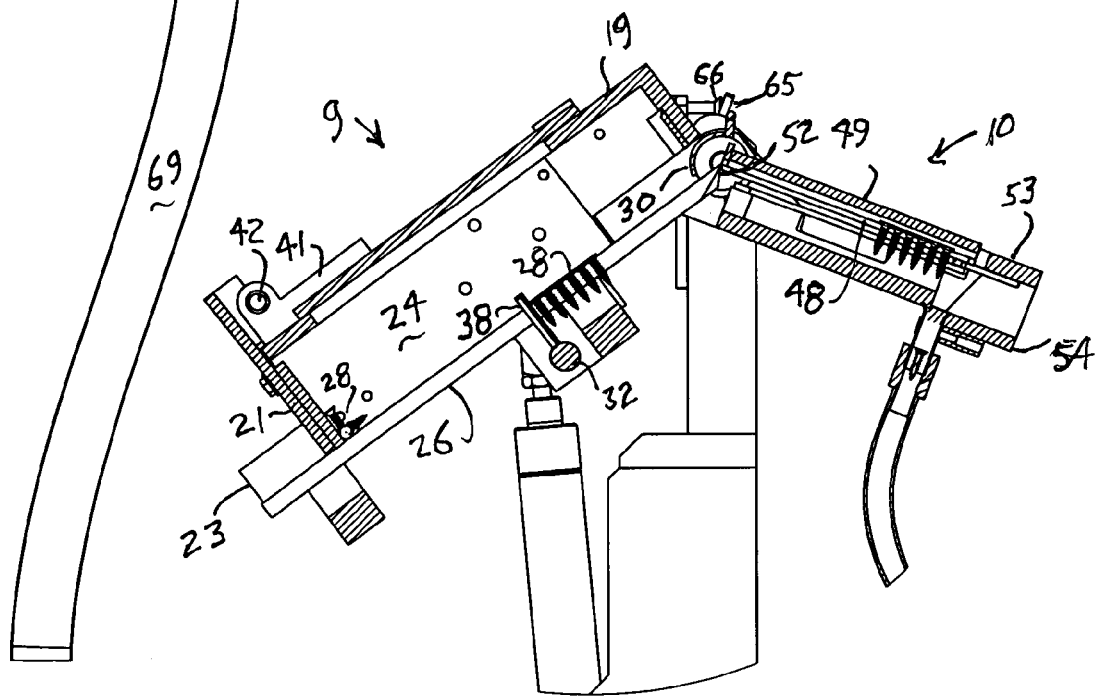
FIG. 3 is a blown-up fragmentary portion taken of circular portion designated A of the sectional view of FIG. 2 of the apparatus of FIGS. 1 and 2.
Figure 4:
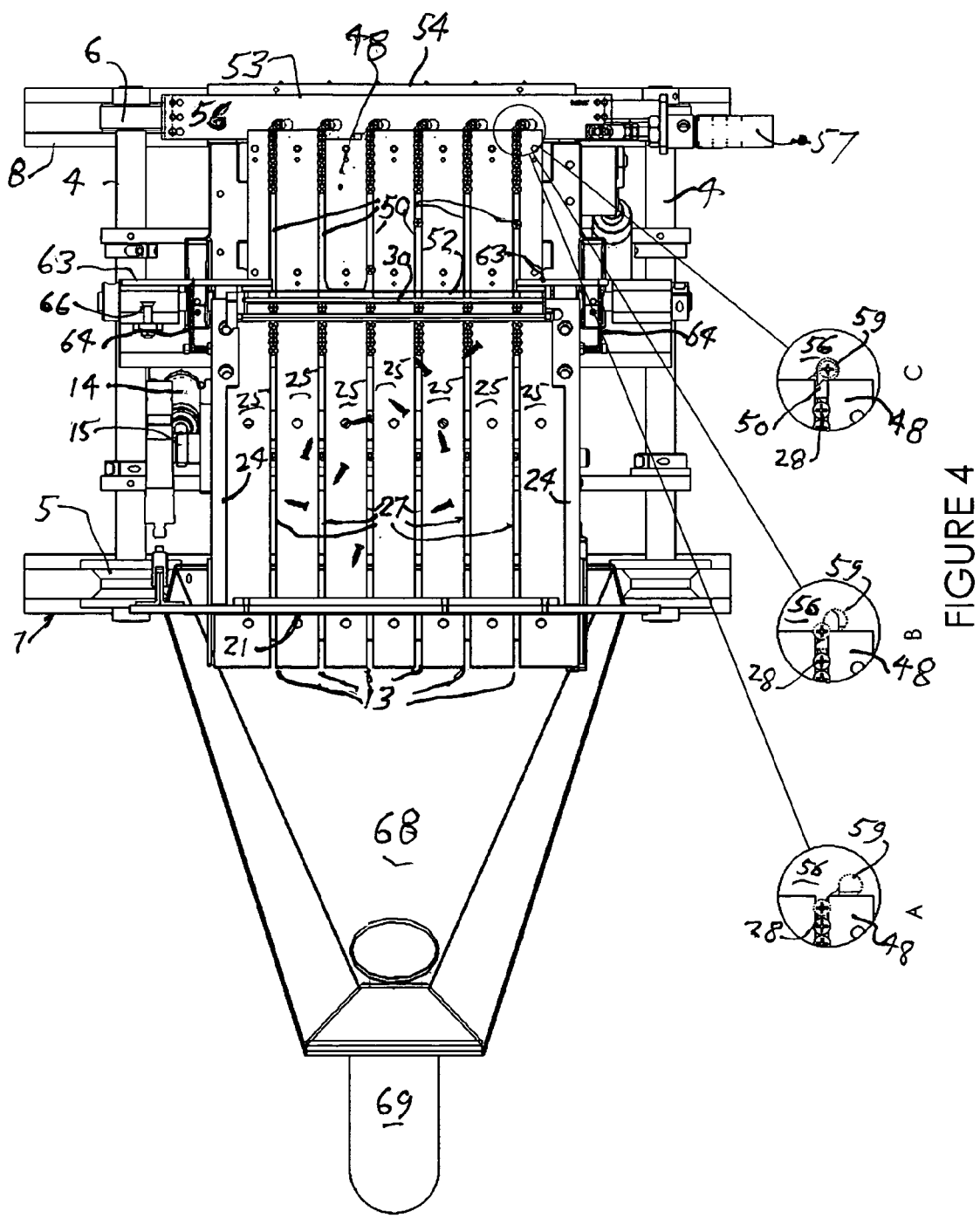
FIG. 4 is a cross-sectional plan view taken along lines 4-4 of the apparatus of FIG. 1 and showing in balloons A, B and C a blown-up fragmentary portion thereof in three different stages of movement, as will be described.

Collator section 9 comprises a collator box or container 19 which has end walls 20 and 21 that extend parallel to axle 11 and define the end 22 thereof adjacent to axle 11 and the opposed end 23 distant from axle 11, respectively. Side walls 24 of collator box 19 extend transversely to axle 11. Together the side and end walls will serve to retain a collection of screws in the collator during reciprocation thereof about axle 11. A series of narrow rectangular plates 25 form the floor 26 of collator box 19. Each plate 25 extends with its narrow width parallel to axle 11 and its longitudinal sides transverse thereto. Plates 25 in the longitudinal direction toward axis extend to and terminate adjacent 21 to axle 11. In the longitudinal direction away from axle 11, plates 25 extend to end 23 distant from axle 11. Adjacent plates 25 are spaced apart at their longitudinal margins to form slots 27 therebetween which are also transverse to axle 11. Slots 27 are narrower than the diameter of the heads of the screws to be collated and dispensed but are wide enough to receive the shanks of the screws loosely enough that that the screws may fall into the slots and be slid therealong. As best seen in FIGS. 2, 3 and 4 the screws 28 will be suspended in the slots by the screw heads resting against the tops of plates 25 at the margins of the slots 27. In the direction of end 23 slots 27 extend a short distance under and beyond end wall 21 and their ends 13 are open so that screws moving to ends 13 can slide out of their respective slots.

End wall 20 terminates at a lower margin 29 at a distance above floor 26 leaving a rectangular gap therebetween for a flow regulator gate 30 as will be described below.

Extending over floor 26 and supported by the tops of walls 20, 21 and 24 is a box cover 31 having a central opening covered by flexible flange which screws may be lifted for inserting screws into the box for feeding by the screw feeder.

Figures 6, 7:
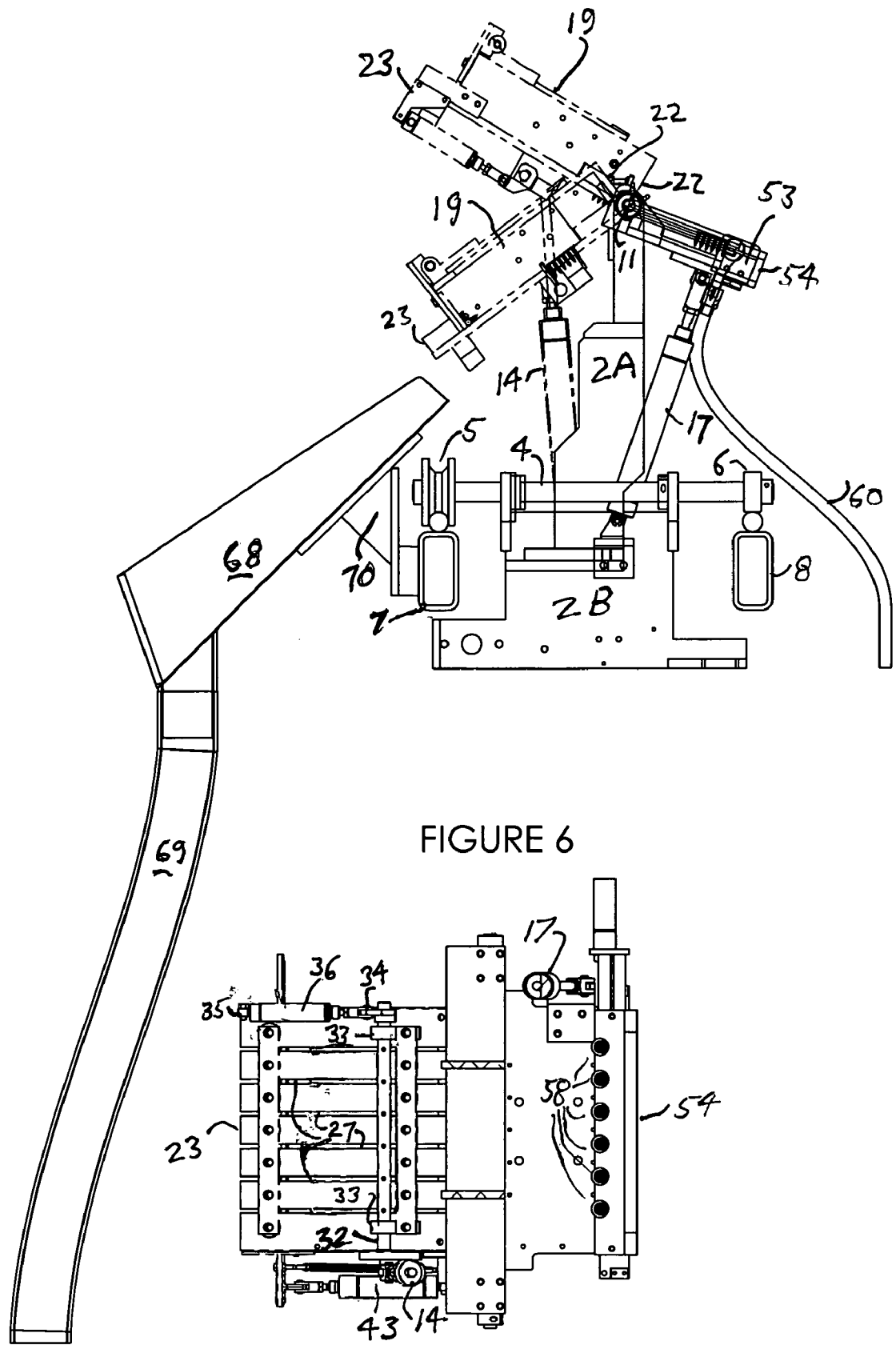
FIG. 6 is a side view of the apparatus of FIG. 1, showing in phantom the collator box tilted to its most upward position and to its most downward position.
FIG. 7 is a is cross-sectional plan view taken along lines 7-7 of FIG. 1, showing the collator box and dispensing section from underneath.
Figure 8:
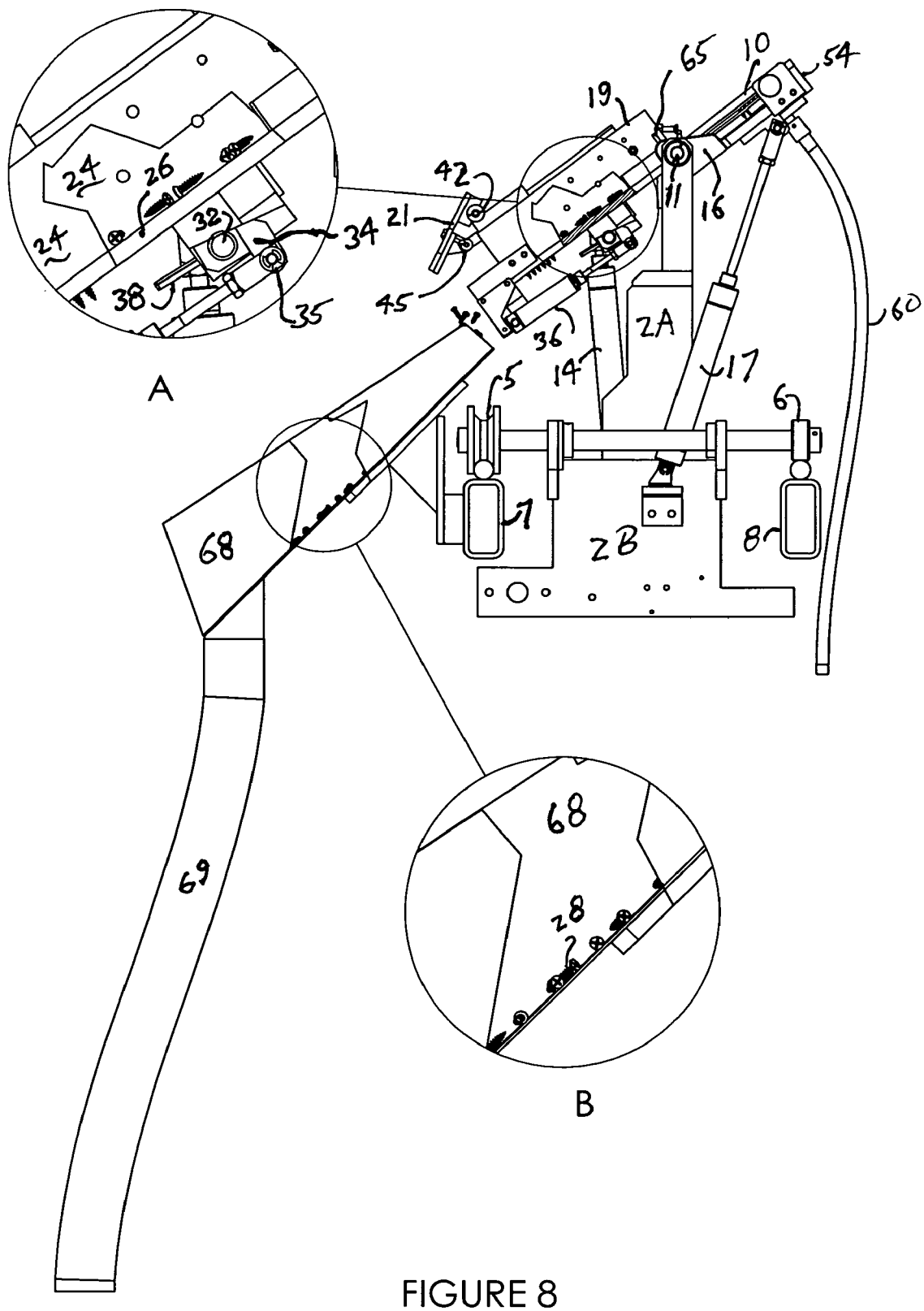
FIG. 8 is a the same side view as FIG. 6 but showing the collator box in its downward tilted position, the dispensing section in its upward tilted position and the upstream end gate of the box open for discharging the screws in both the dispensing section and the collator section back down to the collection chute during changeover to dispensing another style of article and showing in balloon A, in a blown-up fragmentary cutaway view, the collator box floor with the detent pins in retracted position to allow screws in the floor slots to travel back down and out of box and in a balloon B, in a blown-up fragmentary cutaway view, the chute showing screws travelling down for collection.

As seen in FIGS. 1, 3 and 7, axle 32 under floor 26 of collator box 19 at about the midpoint between end walls 20 and 21 extends thereacross parallel to axle 11. Axle 32 is mounted for rotation about its longitudinal axis by means of bearings 33 which are affixed to side walls 24 at either side. An arm 34 is mounted on one end of axle 32 extending axially downwardly below axle 32. An air piston 36 is secured at one end by pivot 35 to the axially outward end of arm 34 and at the other end to side wall 24 by pivot 37. Piston 36 may be urged against the outward end of arm 34 and move it to thereby rotate axle 32 about 100 degrees. Pins 38 are mounted in a row along axle 32 and each pin location is immediately below a slot 27 in floor 26. With arm 34 in the downward position as shown in FIG. 3, the row of pins 38 extend directly upwardly through slots 27 and into box 19. With arm 34 rotated by operation of piston 36, pins 38 are retracted through slots 27 to a position completely below floor 26 and out of the path of screws moving along slots 27, as seen in FIG. 8.

At end 23 of box 19 end wall 21 is hung in a manner so that it can swivel open and thus act as a gate for the purpose of removal of screws from the collator in a changeover to feed a different type of screw. This is accomplished by pivots at the top of end wall 21, one at either side thereof and each pivoting about the same axis parallel to the longitudinal direction of the end wall 21. The pivots each comprise a journal bearing 40 attached to the end wall 21, a journal bearing 41 attached to a respective side wall 24 and an axle 42 engaged by both journal bearings 40 and 41. At the outer side of box 19 a piston 43 is secured at one end by pivot 44 to side wall 24 and at the other end to end wall 21 by pivot 45 for urging end wall 21 about pivots 39 between an open position as shown in FIG. 8 and a closed position, as shown in FIGS. 1 and 3. End wall 21 at end 23 is otherwise free from attachment to side walls 24 and floor 26 of the box. When the end wall 21 is in the closed position, the bottom margin 42 of end wall 21 abuts floor 26. In that position the heads of any screws in slots 27 of box 19 will bear against the bottom of wall 21 and thus be retained from sliding out of the box.

As seen in FIG. 6, box 19 is positioned with its end 22 adjacent axle 11 so that, by operation of piston 14, it can be rotate downwardly in the direction away from axle 11 to a tilted position where its floor 26 is inclined about 45 degrees from the horizontal and upwardly in the direction toward axle 11 to an upward tilted position where floor 26 is inclined about 45 degrees from the horizontal.

Referring particularly to FIGS. 1, 2A, 3 and 4, dispensing section 10 comprises a floor 48 having slots 50 each of which is perpendicular to axle 11 and in end to end alignment with a respective slot 27 of box 19. As seen in FIG. 2A, cover plates 49 extend over floor 48 and a longitudinal margin of each extends partially over an adjacent slot 50 to help maintain the screws in the slot. Plates 49 are spaced a distance above floor 48 sufficient provide clearance for the heads of the screws in slots 50 that extend above floor 48.

Slots 50 extend longitudinally from end 52 of dispensing section 10 adjacent axle 11 up to and under escapement 53 adjacent end 54 of dispensing section and lying transversely to the longitudinal direction of slots 50.

Escapement 53 has a frame 55 in which escapement bar 56 is slideable over floor 48 transversely to slots 50, actuated by cylinder 57 as best seen in FIGS. 1 and 4. Immediately below escapement bar 56 vertical screw receiving holes or channels 58 extend downwardly through floor 48. Escapement bar 56 lies in the paths slots 50 and has conventional escapement notches 59 at the side confronting slots 50 which are spaced therealong so a notch 59 will register with each slot 50 when escapement bar is appropriately positioned in its slidable direction. When so registered, a screw may advance into each notch and be dropped down a channel 58, as shown in progressive steps in balloons A, B and C of FIG. 4. When escapement bar 56 is slid out of register, it stops further movement of screws in the direction of end 54 in advance of channels 58.

Figure 5:
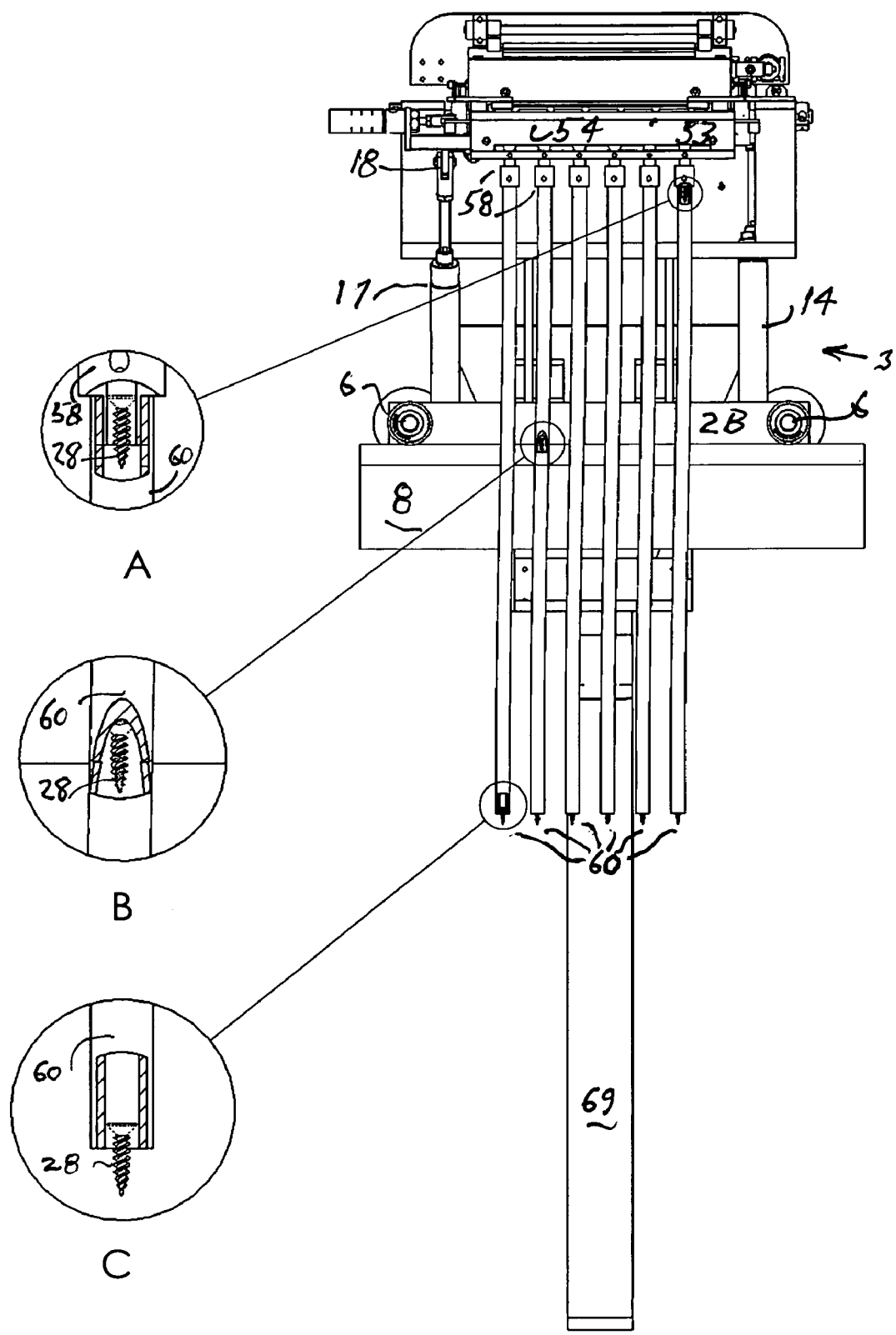
FIG. 5 is end view of the apparatus of FIG. 1 from the dispensing section end additionally showing in balloons A, B and C blown-up fragmentary cutaway portions of the dispensing tubes showing screws being dispensed down the tubes.

As shown in FIG. 5, tube 60 is attached to the lower end of each channel 58 in escapement 53 to receive screws that drop through the respective channel 58 and transport them by gravity to a site (not shown) where they may be used in automatic screw driving equipment.

Dispensing section 10 is positioned with its end 52 adjacent axle. By operation of piston 17, dispensing section 10 can be rotate downwardly in the direction away from axle 11 to a tilted position where its floor 26 is inclined about 40 degrees from the horizontal and rotated upwardly in the direction toward axles 11 to a tilted position where floor 26 is inclined about 45 degrees from the horizontal.

Dispensing section 10 is positioned along axle 11, relative to the position of box 19, so that in the direction normal to axle 11 each of slots 50 aligns with a respective slot 27 of box 19. When dispensing section 10 is at its downwardly tilted position and box 19 is at its upward tilted position, end 52 of the dispensing section is in direct abutment with end 22 of box 19. At that relative position floor 26 of box 19, each of its slots 27 is aligned with a slot 50 of dispensing section 10 and together they form a continuous slot. Similarly, when dispensing section 10 is at its upwardly tilted position and box 19 is at its downward tilted position, end 52 of the dispensing section is in direct abutment with end 22 of box 19 and each of slots 27 is aligned with a respective slot 50 to form a continuous slot.

Figure 9:
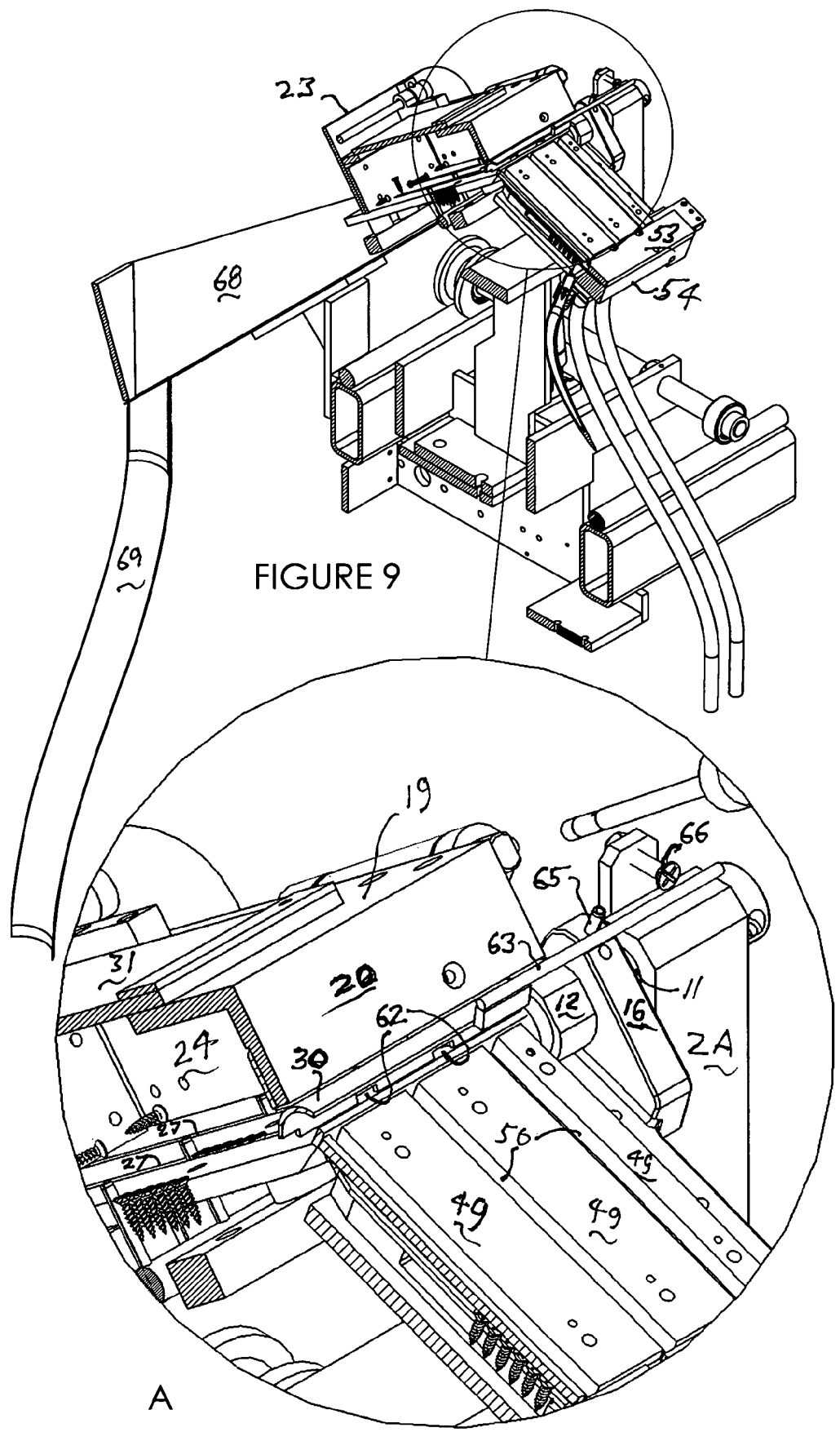
FIG. 9 is an isometric fragmentary cross-sectional view taken along lines 2-2 of FIG. 1, but with the collator box tilted downwardly, showing in balloon A, in a blown-up view, details of the, regulator gate at the end of the collator box.

Referring now to FIGS. 9, regulator gate 30 is positioned in the gap between lower margin 29 of end wall 20 and floor 26 of box 19. Gate 30 has portals 62 along its length, each positioned to be over a slot 27 of box 19. Integral with gate 30, at either end thereof, are operating rods 63, each extending over and supported by a respective bearing 12 of collator section 9. As seen in FIGS. 1 and 4, each rod 63 is held by a spring 64 that is fastened at the other end to a side wall 24 of box 19. Springs 64 urge rods 63 and thus gate 61 to follow box 19 as it rotates downwardly. At either side a stop 65 projects upwardly from a respective journal bearing 16 of dispensing section 10 into the path of movement of the respective rod 63 for following box 19 as it rotates downwardly about axle 11. Additionally, at one side a stop 66 extends above an arm of bracket 2A of the feeder and stop 66 is also in the path of movement of the rod on that side for following box 19 downward.

With the dispensing section 10 downwardly inclined for feeding operation, gate 30 will be closed against floor 26 when box 19 moves to its upwardly inclined position so that screws in the box can move into the dispensing section only through portals 62 over slots 27. Then when box 19 moves to its downwardly inclined position, rods 63 will be engaged by stops 65 thus preventing gate 30 from following box 19 downwardly. As seen in FIGS. 2 and 9, this brings gate 30 to a raised position over floor 26, thus freeing any screws jammed in portals 62 or under gate 30 to move back to the lower end of box 19.

When box 19 is moved to the downwardly inclined position and dispensing section to its upwardly inclined position for changeover to other screws, stop 66 will engage rod 63 on that side and prevent gate 30 from following box 19 downwardly. Thus, gate 30 will be raised from floor 26 so that screws sliding down from dispensing section 10 are not impeded in their movement back to box 19.

For convenience, means is provided for collecting and accumulating screws falling from box 19 during changeover to a different type of screw. In this embodiment a chute 68 is positioned so that its mouth is below end 23 of box 19. Thus, when box 19 is tipped to tilt downward toward end 23 with wall 21 in the open position, the screws will all spill into chute 68 and fall downward into pipe 69 connected at the bottom thereof. Pipe 69 can then carry the screws to a convenient collection container (not shown). As seen in FIG. 2, in this particular embodiment, chute 68 is attached by flange 70 to guide beam 7 of the associated assembly equipment. Thus, for use of chute 68 to collect screws in this embodiment, screw feeder 1 is first moved transversely along beams 7 and 8 to a position where chute 68 is directly below end 23 of box 19. In other embodiments chute 68 may attached directly to the feeder so that it is always in position for collecting screws on changeover.

Operation of the feeder proceeds as follows. For feeder operation, dispensing section 10 will be set at its downward tilted position to receive screws transferred over from the collator section. In collator section 9 pins 38 will be set in their upright position extending into box 19 by operation of piston 36. A collection of the selected type of screw is deposited in the box by the operator and box 19 is set to continuously reciprocate between its upward and downward tilted positions by actuation of piston 14. The oscillation of the box causes the screws 28 lying loosely therein to slide from one end to the other and randomly fall into slots 27 with the screws oriented in a generally heads up position. Pins 38 facilitate screw collation by disrupting the screws as they slide past during reciprocation, causing them to tumble and separate so that they are more likely to fall into slots 27. Screws that have fallen into slots 27 downstream of pins 38 will queue up behind pins 38 during oscillation of box downward and the mass of uncollated screws will slide to the upstream end of box 19. Upon oscillation of box 19 back to the upwardly tilted position, the queued screws downstream of pins 38 will slide down the downstream end 22 of box 19 ahead of the uncollated screws sliding down from the upstream end 23 and thus will transfer over from slots 27 to slots 50 unimpeded by the uncollated screws.

The screws thus received in each slot 50 will move downward by gravity to escapement 53 to be picked off one by one by the escapement for deposit in their respective receiver. When box 19 reaches it upward tilted position screws captured in slots 27 downstream of pins 38 will slide down their respective slot toward end 22, pass over to and become engaged by in adjacent slot 50 in dispensing section 10. These screws will then slide down their respective slot 50 to form a queue in front of escapement bar 56 with the lead screw against the escapement bar. Escapement bar 56 is then actuated to pick off the lead screws at each slot, one at a time, and drop the screws down through their respective tubes 60 to a receiver for each tube (not shown).

The foregoing cycle will be repeated in the feeding operation until the operator wishes to feed a different type of screw to the receivers. The operator will then stop the reciprocation cycle with box 19 at its downward tilted position. If necessary, screw feeder 1 is then moved along guide beam 7 and bearing beam 8 to bring end 23 of box 19 directly under chute 68. Piston 36 is actuated to move pins 38 to the position below box 19 and out of the path of screws 28 in slots 27. Cylinder 17 is actuated to bring dispensing section 10 to its upward tilted position, thus bringing its end 52 into abutment with end 22 of box 19 and aligning slots 27 with slots 50. This will cause all of the screws in slots 50 of dispensing section 10 queued at escapement bar 56 to slide down slots 50 and cross back over to the respective slots 27. Piston 43 is actuated to raise wall 21 from floor 26 and out of the path of screws sliding on floor 26 and in slots 27. Thus, all of the screws 28 on the collator floor will slide out end 23 thereof, as will all of the screws 28 in slots 27 of the box slots, including those that have slid back from slots 50 of dispensing section 10. The screws will all fall into chute 68 for collection and deposit in an appropriate container for later use.

Piston 43 will then be actuated to close wall 21, piston 36 will be activated to again raise pins 38 to their upright position above box floor 26 and piston 17 will be actuated to bring dispenser section 10 to its downward tilted position. The newly selected screws may then be deposited in box 19 and the screw feeding cycle resumed with the new screws.

Alternative embodiments of this invention may be based upon the screw feeders disclosed in Applicant's U.S. Pat. No. 5,425,473, the disclosure of which is incorporated herein by reference. Rather than utilizing separately articulating collators and dispensing section as in the above embodiment, in the screw feeder design disclosed in the patent the dispensing section is contiguous with the collator and reciprocates with it within the same container. As in the above embodiment, the slots of the collator section may be extended completely to end the of the collator distant from the dispensing section and the end wall at that end provided with a gate that can open out of the screw pathways of the slots and of screws sliding along the collator floor. A screw collecting funnel may also be placed below the end of the collator as in the above embodiment. For the screw changeover in the case of an embodiment based upon FIGS. 11-13 of Patent '473, the fingers 39 are first moved out of the slots by operation of air cylinder 33 to permit screws adjacent the escapement to slide toward the collator. Similarly, for the embodiment of FIGS. 14-15 of Patent '473, detent rods 51 are first moved out of the slots by operation of air cylinder 33. The collator can then be brought to the downward tilted position so that the all the screws queued in the slot up to the escapement will slide down and exit the collator into the funnel along with the loose screws lying in the collator. For screw changeover of an embodiment based on FIGS. 1 to 10 of Pat '473 the screws adjacent the escapement in the recessed portion of the groove will not slide toward the collator so they will still require removal by hand.

The invention claimed is:

1. An article feeder comprising:
   a. a collator section having a container for receiving articles in a random array for collating, the container having a floor and at least one track along the floor for receiving and collating the articles into a row and guiding them to an article dispensing section, the track extending to a release end of the container and in an opposed direction toward the article dispensing section,
   b. means for oscillating the container about an axis for tilting the container in the track direction between a position with the track tilted downward toward the release end of the container and a position with the track tilted upward toward the release end of the container and
   c. an article dispensing section adjacent the downstream end of the collator section and adapted to receive articles from the collator track and dispense them one by one to a receiver and
   wherein the collator section includes means for selectively opening the release end of the container and means for selectively opening the release end of the track to release out of the container both collated and uncollated articles therein when oscillation of the container is stopped with the container positioned with the track tilted downward toward the release end of the container and
   wherein the container has means selectively operable to detain articles received in the track from sliding back beyond a selected intermediate location along the tracks when the track is tilted downward toward the release end of the container, whereby the detaining means may be selectively rendered operable during operation of the feeder and inoperable when the container is stopped with the track tilted downward toward the release end and the release end of the container and the release end of the track are opened for removal of articles from the feeder for changeover to feed a different article.

2. An article feeder as in claim 1 and wherein the means for selectively opening the release end of the container and the release end of the track includes a gate at the release end of the container.

3. An article feeder as in claim 1 and wherein the container has a plurality of side by side tracks along the floor extending, in the direction of the article dispensing section, from the release end of the container and, in the opposite direction, to their respective opposite ends and the article dispensing section is adapted to receive articles from the said opposite end of each track.

4. An article feeder as in claim 3 and wherein each of the tracks comprises a slot in the container floor.

5. An article feeder as in claim 4 wherein the article detaining means comprises a detent in each of the slots at the intermediate location, the detents being selectively retractable out of the slots to facilitate removal of articles from the container.

6. An article feeder as in claim 5 and wherein each detent comprises a projection projecting through a respective slot into the container that is selectively retractable out of the container.

7. An article feeder comprising:
   a. a collator section having a container for receiving articles in a random array for collating, the container having a floor and at least one collator track along the floor for receiving articles and guiding them in a row to an article dispensing section, the collator track extending in one direction toward a release end of the container and in an opposed direction toward the dispensing section to an opposite end of the track,
   b. means for oscillating the container about an axis for tilting the container in the collator track direction between a position with the collator track tilted downward toward the release end of the container and a position with the collator track tilted upward toward the release end of the container,
   c. an article dispensing section adjacent the said opposite end of the collator section track having at least one dispenser track and an escapement adapted for intercepting articles fed to the escapement along the dispenser track and for dispensing them one by one to a receiver, the article dispenser track extending from an end adjacent the said opposite end of the collator track of the collator section and extending to the escapement and
   d. means for moving the dispensing section, independently of the container, about an axis to a position with the dispenser track tilted downward toward the escapement and to a position with the dispenser track tilted upward toward the escapement,
   the said opposite end of the collator track and the said adjacent end of the dispenser track being disposed in article delivering and receiving relationship (a) when the container is in the position with the collator track tilted upward toward the release end of the container and the dispenser section is in the position with the dispenser track tilted downward toward the escapement thus allowing articles in the collator track to move by gravity into and down the dispenser track to queue up at the escapement for dispensing and (b) when the container is in the position with the collator track tilted downward toward the release end of the container and the dispenser section is in the position with the dispenser track tilted upward toward the escapement thus allowing the articles to move by gravity back into the collator track for removal from the feeder during a changeover to new articles and
   wherein the collator section includes means for selectively opening the release end of the container and means for selectively opening the release end of the collator track to release both collated and uncollated articles residing in both the collator track and dispenser track and uncollated articles in the container when the container is in the position with the collator track tilted downward toward the release end of the container and the dispenser section is in the position with dispenser track tilted downward toward the release end of the container.

8. An article feeder as in claim 7 and wherein the means for selectively opening the release end of the container and the release end of the collator track includes a gate at the release end of the container.

9. An article feeder as in claim 7 and wherein the container has a plurality of side by side tracks along the floor extending to the release end of the article container and in an opposed direction toward the dispenser section, to their respective opposite ends, the dispensing section has a plurality of side by side tracks each extending from an end adjacent the said opposite end of the collator track of the collator section to the escapement and the said opposite end of each collator track is disposed in an article delivering and receiving relationship with the said opposite end of a dispenser track (a) when the container is in the position with the collator track tilted upward toward the release end of the container and the dispenser section is in the position with the dispenser track tilted downward toward the escapement thus allowing articles in the collator track to move by gravity into and down the dispenser track to queue up at the escapement for dispensing and (b) when the container is in the position with the collator track tilted downward toward the release end of the container and the dispenser section is in the position with the dispenser track tilted downstream toward the escapement thus allowing the articles to move by gravity back into the collator track for removal from the feeder during a changeover to new articles.

10. An article feeder as in claim 9 and wherein each of the container tracks comprises a slot in the container floor and each of the dispenser tracks comprises a slot in the dispenser section.

11. An article feeder as in claim 10 and wherein the container has means operable during oscillation of the container to detain articles received in the slots from sliding back beyond a selected intermediate location along the slots of the container when the slots are tilted downward toward the release end of the container, the detaining means being selectively rendered inoperable when the container is stopped with the slots tilted downward toward the release end and the release end and the release end of the container and the release ends of the slots are opened for removal of articles from the feeder for changeover to feed a different article.

12. An artide feeder as in claim 11 wherein the article detaining means comprises a detent in the slots at the intermediate location the detents being selectively retractable out of the slots to facilitate removal of articles from the container.

13. An article feeder as in claim 12 and wherein each detent comprises a projection projecting through a respective slot into the container that is selectively retractable out of the container.

14. An artide feeder as in claim 10 and wherein the feeder further comprises a regulatory gate at the said opposite ends of the collator slots that is operable, when closed, to restrict movement of articles out of the collator section to those received in the collator slots and when open to make a gap above the container floor at the said opposite ends of the slots and means for opening the gate when the container is in the position with the collator slots tilted downward toward the release end of the container and the dispenser section is in the position with the dispensers slots tilted upward toward the escapement, thus facilitating the movement of articles back into the collator slots for removal from the feeder during a changeover to new articles.

* * * * *